United States Patent [19]
English

[11] 3,879,859
[45] Apr. 29, 1975

[54] METHOD OF VISUAL INSTRUCTION

[76] Inventor: Dolores J. English, Split Rock Rd., Syosset, N.Y. 11791

[22] Filed: Jan. 4, 1971

[21] Appl. No.: 103,479

[52] U.S. Cl............................ 35/8 R; 35/62; 35/66; 401/195
[51] Int. Cl................................................ B43l 1/00
[58] Field of Search ............ 35/7 R, 7 A, 25, 26, 28, 35/35 H, 40, 60, 61, 62, 63, 66, 8 R; 40/140, 219; 46/13; 160/10; 161/3, 3.5, 409; 283/34; 353/11, 44; 401/195; 240/6.46

[56] References Cited
UNITED STATES PATENTS

| | | | |
|---|---|---|---|
| 2,261,320 | 11/1941 | Williams | 240/6.46 |
| 2,522,351 | 9/1950 | Egolf | 35/66 |
| 2,665,608 | 1/1954 | Clark | 353/11 X |
| 2,964,614 | 12/1960 | Buschle | 240/6.46 |
| 2,979,602 | 4/1961 | Barnett | 240/6.46 |
| 3,332,317 | 7/1967 | Peckman | 35/62 X |
| 3,484,956 | 12/1969 | Nightingale | 35/66 |

FOREIGN PATENTS OR APPLICATIONS

| 634,975 | 1/1962 | Canada | 35/26 |
|---|---|---|---|

Primary Examiner—Harland S. Skogquist
Attorney, Agent, or Firm—Laurence B. Dodds

[57] ABSTRACT

An apparatus for visual instruction comprises a substantially planar translucent screen which may be either in the form of a sheet of transparent plastic having one matte surface and one transparent surface or a thin sheet of homogeneous translucent but nontransparent material. One surface of the screen is used as an observation surface by the students. There is provided a writing instrument for depositing an erasable writing medium on the reverse surface of the screen to form alphanumeric characters and a light source movable with the writing instrument is focused to direct a beam on the reverse surface substantially in registry with the point of deposition of the writing medium. In using the writing instrument, each character written on the reverse side is reversed from left to right and the order of the characters is also reversed from left to right so that a student sees the characters in proper form and order on the observation surface of the screen.

1 Claim, 2 Drawing Figures

METHOD OF VISUAL INSTRUCTION

BACKGROUND OF THE INVENTION

It is customary in the instruction of students with the aid of a blackboard for the teacher to stand in front of the board while writing upon it. This usually not only obstructs the portion of the blackboard being written upon from the students' view but it tends to attract the attention of the students to the teacher and to distract their attention from the subject matter being written on the board. These factors are particularly troublesome in the instruction of young children, for example, in kindergarten through the third grade and children with minimal brain damage resulting in perceptual handicaps. Not only is the attention of such children easily distracted but often the observation of the actual process of forming letters is an important part of the instructional process. Furthermore, young children sometimes tend to confuse background and foreground. For example, in textbooks the printing is black on a white background while in writing on a blackboard this relationship is reversed and often confuses a young child. In addition, the teacher's back is turned to the class so that she cannot readily note the extent to which the class is following or monitor discipline.

Therefore, it is an object of the invention to provide a new and improved method of and apparatus for visual instruction which obviates one or more of the above-noted disadvantages of customary visual instruction utilizing a conventional blackboard.

SUMMARY OF THE INVENTION

In accordance with the invention, a method of visual instruction of students having visual perceptual handicaps utilizing a substantially planar translucent screen having an observation surface and a reverse surface comprises writing alphanumeric characters on the reverse of the screen with an erasable writing medium, each character being reversed from left to right and the order of the characters also being reversed from left to right, and simultaneously projecting a beam of light on the reverse surface of the screen substantially in registry with and moving with the writing as the characters are formed, whereby a student sees the characters in proper form and order on the observation surface of the screen.

For a better understanding of the present invention, together with other and further objects thereof, reference is had to the following description, taken in connection with the accompanying drawing, while its scope will be pointed out in the appended claims.

BRIEF DESCRIPTION OF THE DRAWING

FIG. 1 is a perspective view of a visual instruction apparatus suitable for practicing the method of the invention, while

DESCRIPTION OF THE PREFERRED EMBODIMENT

Figure 1:
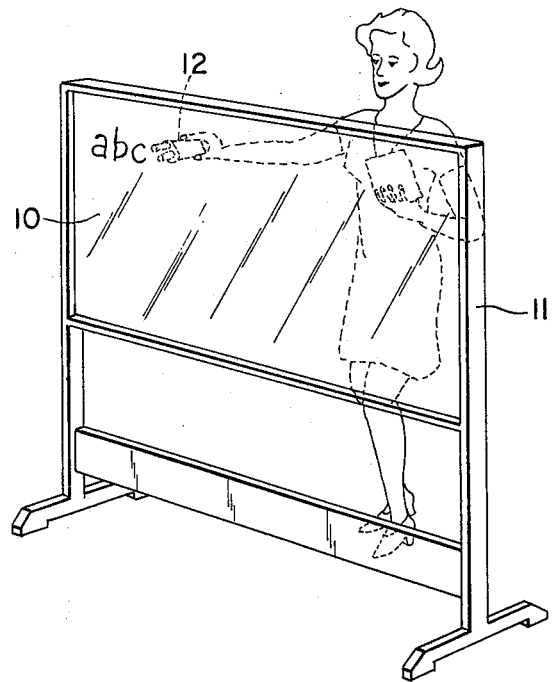

Referring now specifically to FIG. 1 of the drawing, there is represented an apparatus for visual instruction which comprises a substantially planar translucent screen 10 supported in a standard 11. While the screen 10 is shown as fixed in the standard 11, it may be pivotally supported therein in a conventional manner so that it may be inclined at any desired angle. The screen 10 may be either in the form of a sheet of transparent plastic having one matte surface and one transparent surface or a thin sheet of homogeneous translucent but nontransparent material. The front surface of the screen 10, as shown in FIG. 1, is used as an observation surface by the students. The teacher stands behind the screen 10 and is provided with a writing instrument 12 for depositing on the rear surface of the screen 10 an erasable writing medium to form alphanumeric characters. The term "alphanumeric character" is used in its general sense to include alphabetical characters, numerals, and related shapes and forms.

Figure 2:
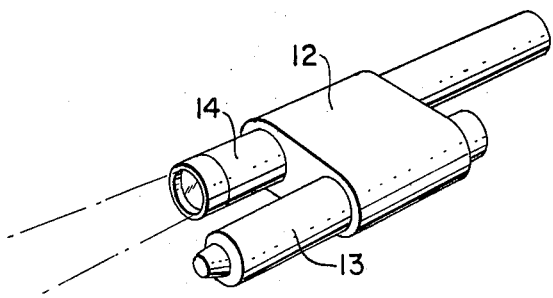
FIG. 2 is a perspective view of the writing instrument of FIG. 1.

As shown in FIG. 2, the writing instrument 12 includes a writing element 13, preferably in the form of a broad-tip felt marking pen fed with an erasable writing medium such as a water-soluble ink. The writing instrument includes a light source 14 movable with the marking pen 13 and preferably attached thereto as illustrated, the relationship of the elements 13 and 14 being such that the light source 14 directs a light beam on the reverse surface of the screen 10 substantially in registry with the tip of the marking pen 13.

In the use of the visual instruction apparatus described, the teacher moves the writing instrument 12 so that each character is written on the reverse side of the screen 10, reversed from left to right, and the order of the characters is also reversed from left to right, as seen by the teacher, so that the student sees the characters both in proper form and order on the observation surface of the screen.

It is seen that in the use of the visual instruction apparatus of the invention, the teacher in no way obstructs the portion of the screen being written upon from the students' view and does not distract the students' attention from the subject matter being written so that the attention of the children is readily concentrated on the lesson being written on the screen. An important advantage of the invention lies in the fact that the student can write on the front surface of the screen simultaneously with or following the teacher as she writes on the reverse surface so that the student receives detailed guidance in the forming of the characters. At the same time, the teacher can face the class, looking over the screen 10, to determine whether or not the instruction is being properly followed and also to monitor discipline.

In the use of the apparatus of the invention, the resultant lesson is written in black on a white background, as in the case of ordinary textbooks, and this tends to minimize confusion sometimes encountered by young children when using white chalk on a blackboard. Further, by inclining the screen 10, it may be given an attitude approximating that of the student's desk on which he is accustomed to write. This avoids the transition from writing on a substantially horizontal plane to writing on a vertical plane, which causes difficulty to some young students.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. The method of visual instruction of students having visual perceptual handicaps utilizing a substantially planar translucent screen having an observation surface and a reverse surface which comprises:

writing alphanumeric characters on the reverse surface of the screen with an erasable writing medium, each character being reversed from left to right and the order of the characters also being reversed from left to right;

and simultaneously projecting a beam of light on the reverse surface of the screen substantially in registry with and moving with the writing as the characters are formed, whereby a student sees the characters in proper form and order on the observation surface of the screen.

* * * * *